(12) United States Patent
Merrill

(10) Patent No.: US 12,179,518 B2
(45) Date of Patent: Dec. 31, 2024

(54) TRUCK TIRE SCRUB INTERVENTION

(71) Applicant: Compagnie Generale des Etablissements Michelin, Clermont-Ferrand (FR)

(72) Inventor: Zachary Alexander Merrill, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 368 days.

(21) Appl. No.: 17/606,474

(22) PCT Filed: May 15, 2019

(86) PCT No.: PCT/US2019/032507
§ 371 (c)(1),
(2) Date: Oct. 27, 2021

(87) PCT Pub. No.: WO2020/231430
PCT Pub. Date: Nov. 19, 2020

(65) Prior Publication Data
US 2022/0194143 A1 Jun. 23, 2022

(51) Int. Cl.
*B60C 11/24* (2006.01)
*B60C 19/00* (2006.01)
(Continued)

(52) U.S. Cl.
CPC ............ *B60C 11/246* (2013.01); *B60C 23/04* (2013.01); *B60G 17/0155* (2013.01);
(Continued)

(58) Field of Classification Search
CPC ........ B60C 2019/004; B60G 2400/824; B60G 2401/16; B60G 2401/28; B60G 2800/214; B60G 2800/24; B60G 2800/915
See application file for complete search history.

(56) References Cited

U.S. PATENT DOCUMENTS 5,071,159 A * 12/1991 Kamimura ........... B60G 17/018
280/DIG. 1
2005/0149240 A1* 7/2005 Tseng ................ B60R 21/0133
280/5.502
(Continued)

FOREIGN PATENT DOCUMENTS

CA 2964946 A1 10/2018

OTHER PUBLICATIONS

McLean, Jack, Kloeden, Craig, Ponte, Giulio, "Characteristics of Rollover Crashes" Mar. 5, 2007, www-esv.nhtsa.dot.gov/Proceedings/20/www-esv.nhtsa.dot.gov/Proceedings/20/07-0479-O.pdf (Year: 2007).*

(Continued)

*Primary Examiner* — Son T Le
*Assistant Examiner* — Brian Butler Geiss
(74) *Attorney, Agent, or Firm* — Neal P. Pierotti

(57) ABSTRACT

A system and apparatus that reduces tire scrub on a truck and or trailer during turns. The system minimizes the redistribution of the load among the tires thereby spreading the load of the trailer or truck among the tires avoiding unnecessary overloading. The system operates without operator intervention and is capable of operating automatically on trailers, without control signals from the truck.

15 Claims, 15 Drawing Sheets

(51) Int. Cl.
    *B60C 23/04*         (2006.01)
    *B60G 17/015*      (2006.01)
    *B60G 17/016*      (2006.01)

(52) U.S. Cl.
    CPC .... *B60G 17/0162* (2013.01); *B60C 2019/004* (2013.01); *B60G 2300/042* (2013.01); *B60G 2400/204* (2013.01); *B60G 2400/824* (2013.01); *B60G 2400/972* (2013.01); *B60G 2401/16* (2013.01); *B60G 2401/28* (2013.01); *B60G 2500/204* (2013.01); *B60G 2500/32* (2013.01); *B60G 2800/214* (2013.01); *B60G 2800/24* (2013.01); *B60G 2800/915* (2013.01)

(56) References Cited

U.S. PATENT DOCUMENTS

| | | | |
|---|---|---|---|
| 2005/0206224 A1* | 9/2005 | Lu | B60T 8/246 |
| | | | 303/7 |
| 2016/0347134 A1 | 12/2016 | Choi | |
| 2017/0116796 A1* | 4/2017 | Kondou | G07C 5/0816 |
| 2019/0226841 A1 | 7/2019 | Johansson | |

OTHER PUBLICATIONS

Brach, Raymond M. Feb. 11, 2003, www.brachengineering.com/content/publications/www.brachengineering.com/content/publications/SAE-970957-Brach-Engineering.pdf. (Year: 2003).*

European Patent Office, International Search Report and Written Opinion for PCT/US/2019/032507, dated Jan. 8, 2020, pp. 1-9 (included), European Patent Office, Rijswijk, The Netherlands.

* cited by examiner

TRUCK TIRE SCRUB INTERVENTION

CROSS-REFERENCE TO RELATED APPLICATIONS

The present application is a 35 U.S.C. § 371 application of PCT/US19/032507 filed on May 15, 2019 and entitled "Truck Tire Scrub Intervention." PCT/US19/32507 is incorporated by reference herein in its entirety for all purposes.

FIELD OF THE INVENTION

The subject matter of the present invention relates to a control system and apparatus for automatically reducing tire scrub of a truck tire.

BACKGROUND OF THE INVENTION

Tires generally move in a direction perpendicular to the axis of rotation of the tire, allowing the tire to roll along the ground. During normal operation, a small amount of wear occurs as the tire deforms to the surface of the ground in the tire's contact patch and back to its equilibrium shape outside the contact patch. When the tire is forced to slide against the ground, larger amounts of wear occurs, and larger amounts of rubber are worn off, sometimes leaving behind skid marks. These lateral movements can rapidly decrease the expected tire tread life. While vehicles are generally designed to minimize tire scrubbing, some amount of scrubbing occurs.

Trucks, such as heavy 6×4 trucks, heavy 6×2 trucks, and trailers, particularly trailers for class 8 trucks, are vehicles designed to carry relatively large loads over long distances where turning radiuses are generally large and lateral tire scrubbing is normally minimal. These trucks and trailers, however, are often subject to short turning radiuses while, for example, negotiating a turn at an intersection or maneuvering in a parking lot. Such intermittent sharper radius turns result in increased lateral loading among a number of the tires on the vehicle and results in increased wear due to scrubbing against the ground surface.

FIG. 1 provides an example of a typical class-8 tractor 1 and a spread axle trailer 10. Spread axle trailers are trailers with two axles positioned apart a distance greater than 10 feet. The spread axle trailer 10, shown here, has two axles; each with an axis positioned a distance, d, 10 feet 2 inches apart. The forward portion 12 of the trailer 10 is connected to the tractor at a hitch coupler 16 that allows the trailer to pivot relative to the tractor. The rearward portion 14 of the trailer 10 includes the rearward axle 40 and the forward axle 20 located between the rearward axle and the hitch coupler 16.

FIG. 2 shows a schematic top view of a prior art tractor and a spread axle trailer 10 as the trailer is negotiating a forward turn to the left. The steer wheels 82, 84 are turned causing the tractor 1 to turn to the left and pull the trailer into a left hand turn as shown. The forward axle 20, right forward tires 72, and left forward tires 74 typically slide across the ground as the trailer pivots closer to the rear axle 40 of the trailer 10. The axis of rotations 272, 274 of the right forward tires 72 and left forward tires 74 during this turn have a large angle to the axis of the forward trailer axle 20 resulting in the tires scrubbing laterally across the ground resulting in skid marks 8. Since the trailer radius of rotation 240 is close to parallel to the axis of the rear axle 40 little scrubbing occurs to the rear tires 76, 78.

In a forward turn to the right, the lateral movement of the trailer at the forward axle 20 results in uneven vertical loading on the suspension and tires of the forward axle 20 driving the trailer's left forward tires 74 downward into the ground as shown in FIG. 3. Increased load on the forward left tires 74 as the tires are pushed laterally to the trailer's left forces the left side of the axle to drop and "dig-into" the ground. The increased loading causes increased wear and tear on the tires, damage to the tire from scrubbing, and accelerate wear on the suspension components of the trailer.

A solution to reduce tire scrub during small radius turns would be desirable. A solution that additionally minimizes the redistribution of the load among the tires would also be desirable. A solution that additionally operates without operator intervention would be particularly desirable. A system, when installed on a trailer, operates automatically without control signals from the truck, has been a long felt need in the industry.

SUMMARY OF THE INVENTION

Aspects and advantages of the invention will be set forth in part in the following description, or may be obvious from the description, or may be learned through practice of the invention.

In one exemplary embodiment, a system for controlling downforce on at least one of a plurality of tires on a vehicle is provided where the vehicle has a forward portion and a rearward portion, the vehicle has at least one forward axle and at least one rearward axle spaced apart from the forward axle, each axle having at least one right tire and at least one left tire, an axle downforce adjustment mechanism to adjust of the downforce of at least one axle tire, the system comprising: a sensor attached to the vehicle for detecting vehicle turns; a vehicle axle control unit; wherein said sensor sends the sensor signal to the vehicle axle control unit; wherein if the vehicle axle control unit determines the vehicle turning, then the vehicle axle control unit sends a control signal to the axle downforce adjustment mechanism to reduce the downforce of at least one of the tires.

In another exemplary embodiment, a vehicle is provided that controls the downforce on at least one of a plurality of tires on the vehicle, the vehicle comprising: a forward portion; a rearward portion; at least one forward axle having at least one right tire and at least one left tire; at least one rearward axle spaced apart from the forward axle, the rearward axle having at least one right tire and at least one left tire; an axle downforce adjustment mechanism to adjust the downforce of the at least one axle tire, a sensor attached to the vehicle for detecting vehicle turns; a vehicle axle control unit; wherein said sensor sends sensor signals to the vehicle axle control unit; wherein if the vehicle axle control unit determines the vehicle turning, then the vehicle axle control unit sends a control signal to the axle downforce adjustment mechanism to reduce the downforce of at least one of the tires.

These and other embodiments, features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides a control system and apparatus for automatically reducing tire scrub of a truck or trailer tire.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

It should be understood that the use of the word "tires" in this application may refer to a single tire at a given location, a single double-wide tire at a given location or a pair of closely spaced tires at a given location, such as in a pair of tires in a dually configuration as commonly found on tractor trailers.

Figure 1:
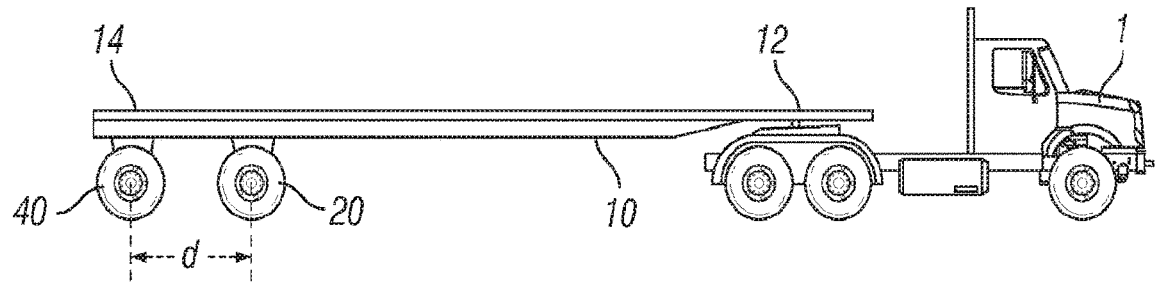
FIG. 1 provides a side view of a typical class-8 tractor 1 and a spread axle trailer 10.
Figure 2:
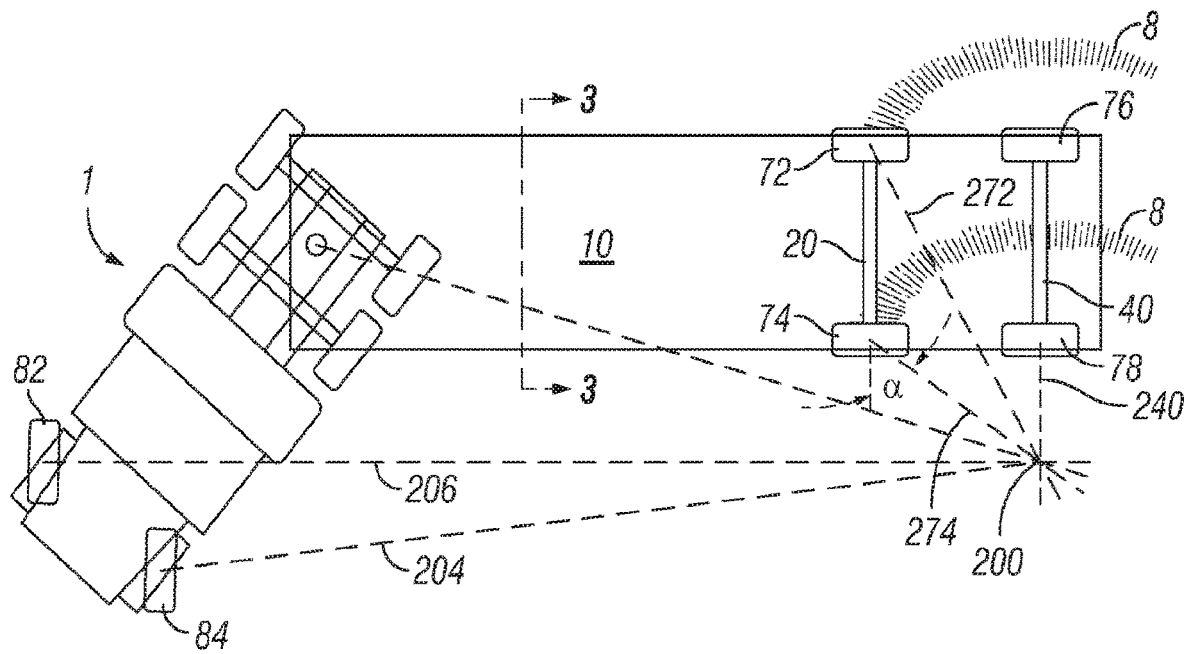
FIG. 2 shows a schematic top view of a prior art tractor and a spread axle trailer 10 as the trailer is negotiating a forward turn to the left.
Figure 3:
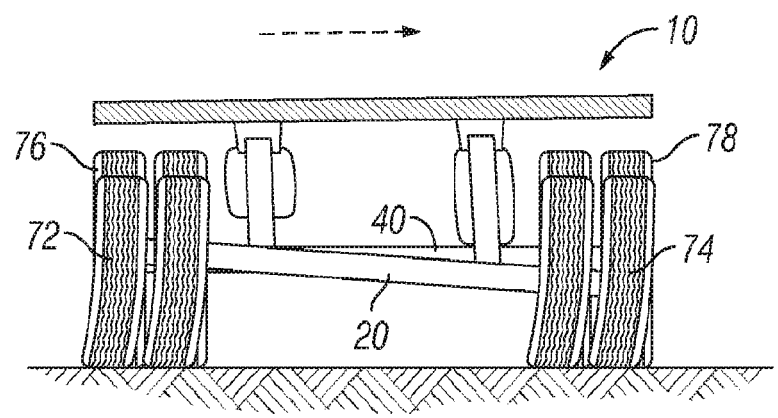
FIG. 3 provides a cross section view taken on line 3-3 of FIG. 2 showing the "digging in" of the forward rear axle of a spread axle trailer during a tight radius turn when loaded.
Figure 4:
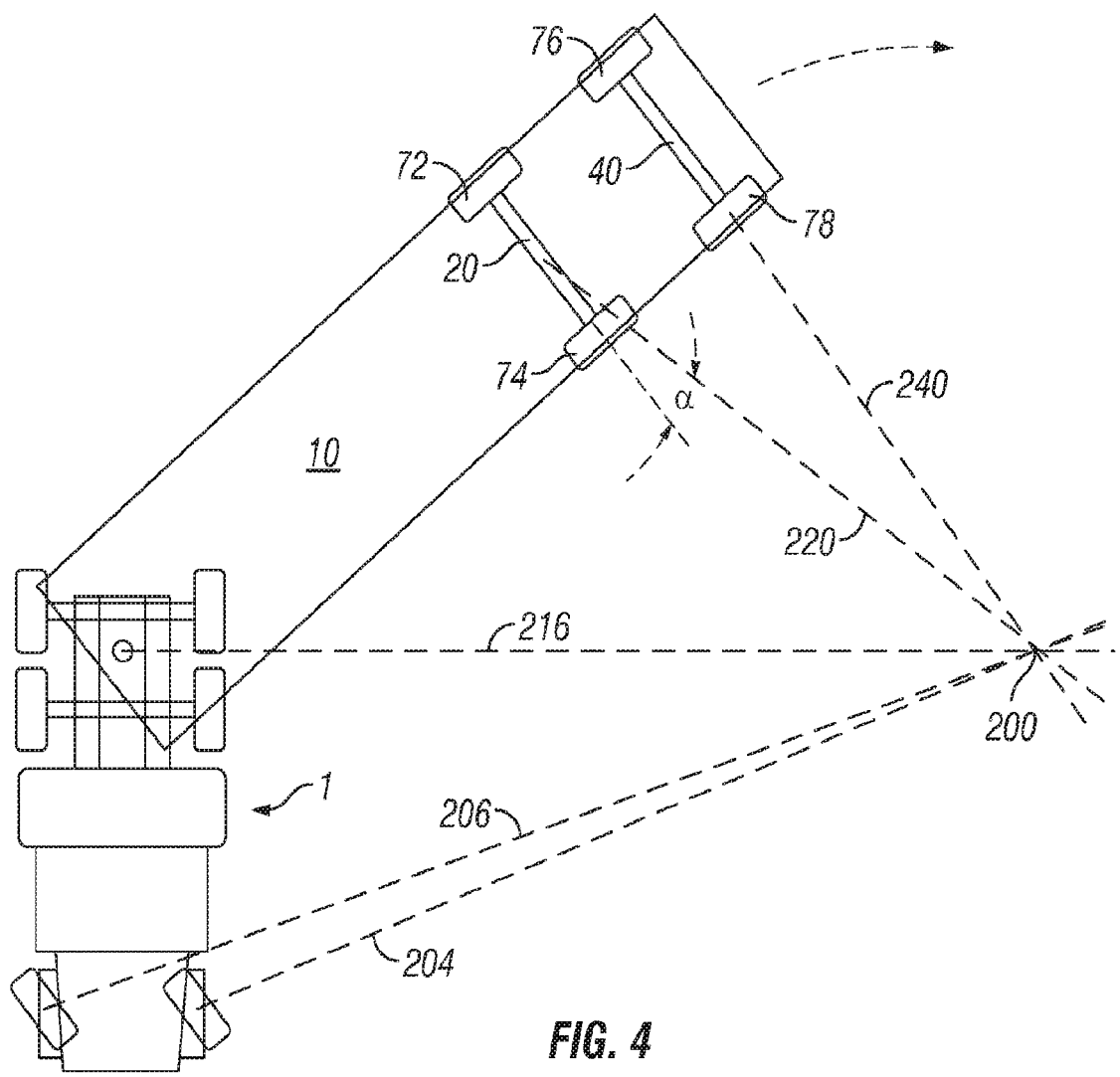
FIG. 4 shows a schematic top view of a tractor 1 and a spread axle trailer 10 as the trailer is negotiating a rearward turn to the left.

FIG. 4 shows a schematic top view of a tractor 1 and a spread axle trailer 10 as the trailer is negotiating a rearward turn to the left. Looking from above the trailer, this is a clockwise rotation of the trailer relative to the ground. The tires of the vehicle generally allow for linear travel perpendicular to their axis of rotation. When multiple tires have axles fixed parallel to one another, one or more tires will experience lateral forces and "scrub" laterally across the surface of the ground. The axis of rotation 200 of the vehicle can be approximately located by following a line parallel to the rotational axis of the tire groups having the least lateral movement relative to the ground. For example, the right front steer tire and the left front steer tire each have a radius of curvature 204, 206, respectively, that extend parallel to the axles of the tires. The steering linkage geometry allows for those imaginary lines extending from the front steer tire axles to intersect near the lateral axis of rotation 200 of the vehicle. The rear axles on the tractor have axles that are fixed parallel to one another. In this example it is assumed that some minimal scrub occurs distributed amongst all the drive tires such that they share a radius of curvature parallel to their axes and positioned somewhere between the two axles. While it can be generalized that the scrub occurs equally amongst all the drive tires, a more accurate description is that in most cases when the vehicle is traveling forward the pivot is nearer the forward axle and when the vehicle is traveling rearward, the pivot is nearer the rearward axle. This radius of curvature 216 also intersects with the front steer tires 82, 84 radius of curvature 204, 206 at the axis of rotation of the vehicle.

The trailer 10 in this example has a spread axle configuration. Due to the typical loading of the trailer and trailer design, the axis of rotation 200 and radius of curvature 240 of the rear axle 40 of the trailer 10 is generally parallel to the rear axle 40 of the trailer. In this example the axis of rotation 200 of the trailer 10 is at the same location as the axis of rotation 200 of the tractor 1, which presumes the angle of the trailer to the tractor is not changing during this moment of the turn. The radius of curvature of the forward axle 220 tires is notably not parallel to the axis of rotation of the forward axle, but instead is offset from axle by an angle [alpha]. This results in lateral scrubbing of the tires across the ground surface. If the tires are heavily loaded, damage to the tires and possibly the ground surface may result if some form of intervention is not provided. Additional strain is also placed on the trailer and suspension components. At the least, tire scrub results in accelerated wear of the tires as they are forced laterally across the ground surface. Minimizing the effects of the tire scrub can be accomplished by reducing the force of the tires of the forward axle 20 tires pressing down against the ground surface.

Figure 5:
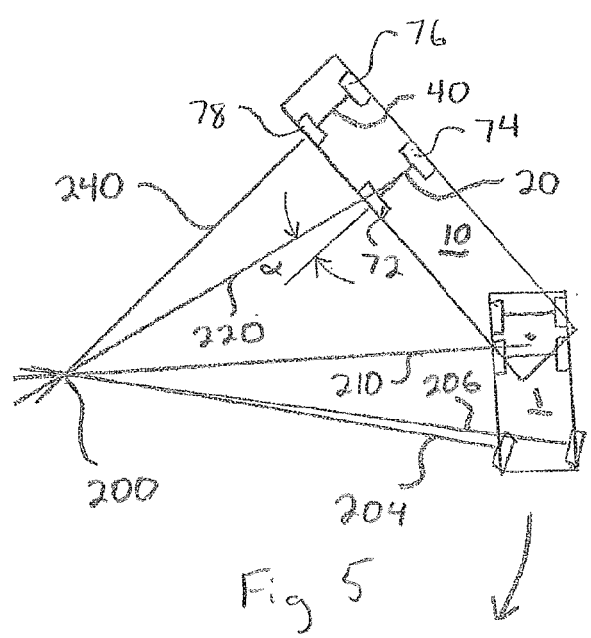
FIG. 5 provides an overhead view of a spread axle trailer negotiating a forward turn to the right.

In at least one embodiment of the invention, the system reduces the downward force exerted by the tire that is being pushed by the ground towards the centerline of the vehicle. As shown in FIG. 4 when the vehicle is in a left hand turn in a rearward direction as shown by the arrow, the system reduces the downward force exerted by the forward right trailer tires 72. Similarly, when the vehicle is in a left hand turn in a forward direction, the system reduces the downward force exerted by the forward left trailer tires 74. When the vehicle is in a forward right hand turn, as shown in FIG. 5, the system reduces the downward force exerted by the forward right hand trailer tire 72. When the vehicle is in a right hand turn in a rearward direction the system reduces the downward force exerted by the forward left hand trailer tire 74.

Another way of describing the conditions upon which the system reduces the downward force to the appropriate spread axle trailer tire is to examine whether the trailer is undergoing a clockwise or a counterclockwise rotation relative to the ground. Under appropriate conditions, when the trailer is rotating counter-clockwise, the system reduces the downward force exerted by the left hand forward trailer tire 74. Under appropriate conditions, when the trailer is rotating clockwise, the system reduces the downward force exerted by the right hand forward trailer tire 72. In at least one embodiment, the system only reduces the downward force exerted by the forward tire when the trailer is turning and moving below a given speed, for example, below 30 miles per hour. In at least another embodiment, the system only reduces the downward force exerted by the forward trailer tire 72 or 74 when the trailer is turning with a turning radius of less than a desired value, for example when the turning radius of the trailer is less than 150 feet, or alternatively less than 100 feet, or less than 75 feet, or less than 50 feet, or less than 30 feet, etc. In at least another embodiment, the system reduces the downward force exerted by the forward trailer tire 72 or 74 when the system determines a speed below a desired value and a turning rate that is higher than a desired value. In yet another embodiment, the system reduces the downward force exerted by the forward trailer tire 72 or 74 when the system determines a specified amount of rotation of the trailer over a specified minimum distance traveled. For example, the system signals activation of the tire scrub intervention based upon a threshold turning detection value. In such an embodiment, the system samples at 120 hertz. The system, in such an embodiment, must have enough samples to detect a consistent turn. In this particular embodiment, how far the vehicle has traveled between samples will depend upon speed, so the activation of the scrub intervention is dependent upon speed and will trigger at smaller radiuses when at lower speed than it would at higher speeds.

Figure 6:
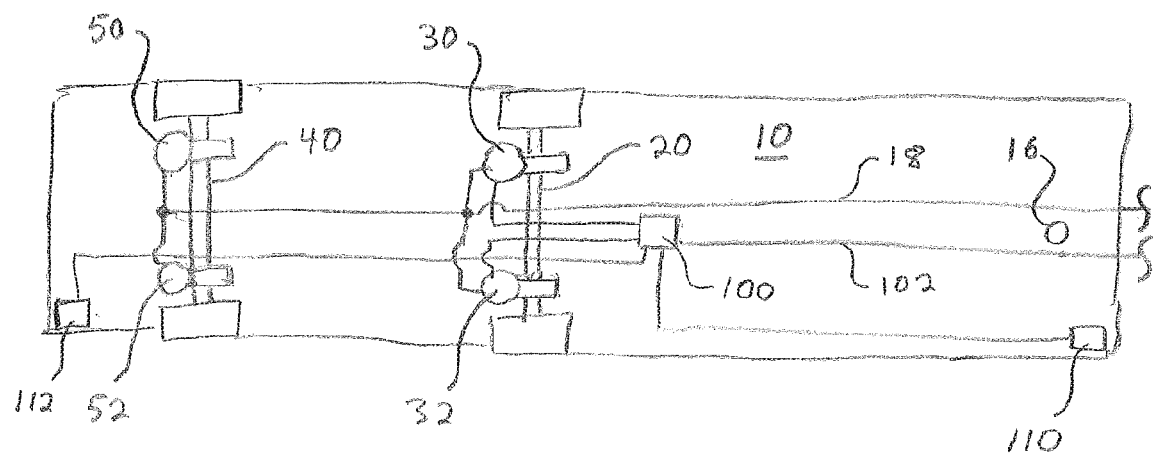
FIG. 6 provides a schematic view of a spread axle trailer 10 showing an embodiment of a system to automatically reduce the downward force of the forward axle tires against the ground upon detection of conditions resulting in tire scrub.

FIG. 6 provides a schematic view of a spread axle trailer 10 showing an embodiment of a system to automatically reduce the downward force of the forward axle tires against the ground upon detection of conditions resulting in tire scrub. The trailer shown in this embodiment possesses four air suspension bags 30, 32, 50, 52, two located at the forward axle 20 and two located at the rearward axle 40. These air suspension bags 30, 32, 50, 52, are inflated by an air supply, here by an air pressure line 18 that is pressurized by a compressor onboard the tractor 1 and each air suspension bags 30, 32, 50, 52 supports a portion of the load of the trailer 10.

In the embodiment of the invention shown here, a vehicle axle control unit 100 receives location information from a forward located Global Positioning System ("GPS") module unit 110 and a rearward located GPS module unit 112. The system tracks the speed and maneuvers of the trailer. Using the sensor signal that it tracks, vehicle axle control unit 100 autonomously manages the air-spring downforce distribution among the wheel ends of the trailer axles in an effort to mitigate the damaging effect of the trailer's lateral tire scrub during low-speed turn maneuvers.

When the vehicle axle control unit 100 detects an event that is likely to cause trailer tire scrubbing, the system deflates one of the forward axle 20 air suspension bags 30, 32, reducing the downward force on the tires of the forward axle and thereby reducing the lateral forces experienced by those tires. Alternatively, the system may deflate both forward axle 20 air suspension bags 30, 32, reducing the downward force on the tires of the forward axle and thereby reducing the lateral forces experienced by those tires.

The vehicle axle control unit 100 is powered by the trailer electrical system which, in turn, is powered by the electrical system of the tractor 1. Alternatively the vehicle axle control unit 100 may be powered by other sources, such as being powered by a battery that is charged when the trailer's electrical system 102 is connected to the tractor's electrical system. In at least one embodiment, the vehicle axle control unit 100 remains in a "standby" mode whereby the GPS units are powered continuous or periodically when on battery power and when the system determines an external power source has been applied, it will then wake from standby and manage the downforce distribution among the wheels when it determines that the conditions are appropriate.

The GPS modules 110, 112 may operate independently or communicate to each other. The GPS modules 110, 112 are capable of receiving GPS signals from satellites and transmitting a signal to the vehicle axle control unit 100. In at least one embodiment, the GPS modules 110, 112 are capable of "dead reckoning" feature which helps smooth out the GPS tracking data (sensor signal) in the even that a good GPS signal is momentarily lost. In the event that one GPS module loses positioning signal from a GPS orbital or terrestrial transmitter, such "dead reckoning" feature may utilize the signals received from one of the GPS units to supplement the missing data and/or utilize the last data received by the unit, and/or other positional data, such as data received from an abs sensors or a vehicle speed sensor. In at least one embodiment the GPS module receives signals from an accelerometer, or alternatively a gyroscope, to compensate for momentary loss of the GPS signal.

In this embodiment, when the vehicle axle control unit 100 determines that the trailer 10 is moving at a speed within a specified range and is turning at a specified rate of turn, the vehicle axle control unit sends a control signal to at least one valve to release air from at least one forward axle airbag 30, 32. In this embodiment the control signal is in the form of an electric current sufficient to operate an actuator to move the at least one valve. It should be understood that in alternative embodiments the control signal could take the form of a lack of an electrical current causing a normally open valve to open or a normally closed valve to close. In this embodiment, when the vehicle axle control unit 100 determines that the trailer 10 is rotating counter-clockwise, as viewed from above, it will send the control signal to at least one valve to release air from the left forward axle airbag 30. When the vehicle axle control unit 100 determines that the trailer 10 is rotating clockwise, it will send the control signal to at least one valve to release air from the right forward axle airbag 32.

Figure 7:
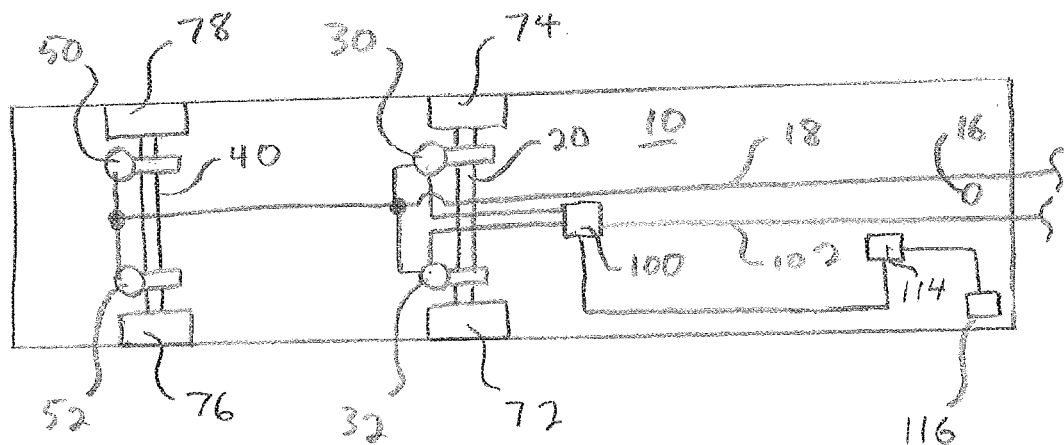
FIG. 7 shows a schematic view of a spread axle trailer 10 showing an alternative embodiment of a system to automatically reduce the downward force of the forward axle tires against the ground upon detection of conditions resulting in tire scrub.

FIG. 7 shows a schematic view of a spread axle trailer 10 showing an alternative embodiment of a system to automatically reduce the downward force of the forward axle tires against the ground upon detection of conditions resulting in tire scrub. Like the previous embodiment, the trailer shown in this embodiment possesses four air suspension bags 30, 32, 50, 52, two located at the forward axle 20 and two located at the rearward axle 40. These air suspension bags 30, 32, 50, 52, are inflated by an air supply, here by air pressure line 18 that is pressurized by a compressor onboard the tractor 1 and each air suspension bags 30, 32, 50, 52 supports a portion of the load of the trailer 10.

In this embodiment a GPS antenna 116 is positioned on the trailer 10. The antenna is connected to the GPS module 114 which receives global positioning data. The data is transmitted to the vehicle axle control unit 100. The system also contains at least one transducer, such as an accelerometer or a gyroscope, which determines whether the trailer is turning. The vehicle axle control unit 100 receives the accelerometer sensor signal, gyroscope sensor signal, or other dead reckoning sensor signal and the GPS sensor signal and determines if the trailer is moving within a specified speed range and if the trailer is rotating clockwise or counter clockwise at a rate within a specified range. Once it is determined that the trailer speed is within a specified range and the rotation rate is within a specified range and the trailer is rotating counter-clockwise the vehicle axle control unit will release air from the left forward axle air bag 30 reducing the air pressure. If it is determined that the trailer speed is within a specified range and the rotation rate is within a specified range and the trailer is rotating clockwise the vehicle axle control unit will release air from the right forward axle air bag 32.

For example, if the vehicle axle control unit 100 determines that the speed of the trailer is between −15 and 15 MPH and the rate of turn is such that the radius of the turn is less than 100 feet and the rotation is clockwise, the vehicle axle control unit 100 will send the control signal to release air from the forward axle right airbag 32. When a negative value is discussed herein with respect to speed, it infers that the vehicle is traveling backwards, or in other words, in reverse. If the vehicle axle control unit 100 determines that the trailer 10 is operating within those ranges but is turning counter-clockwise, the vehicle axle control unit will send the control signal to release air from the forward axle left airbag 30.

In alternative embodiments, the trailer control unit may be programmed to release air from both forward axle airbags 30, 32 upon determining that the speed and turn rate is within a specified range. For example, if the trailer is moving at a speed between −5 MPH and 5 MPH and the rate of turn is such that the turning radius of the trailer is less than 50 feet, the vehicle axle control unit will deflate both forward axle airbags 30, 32.

Figure 8:
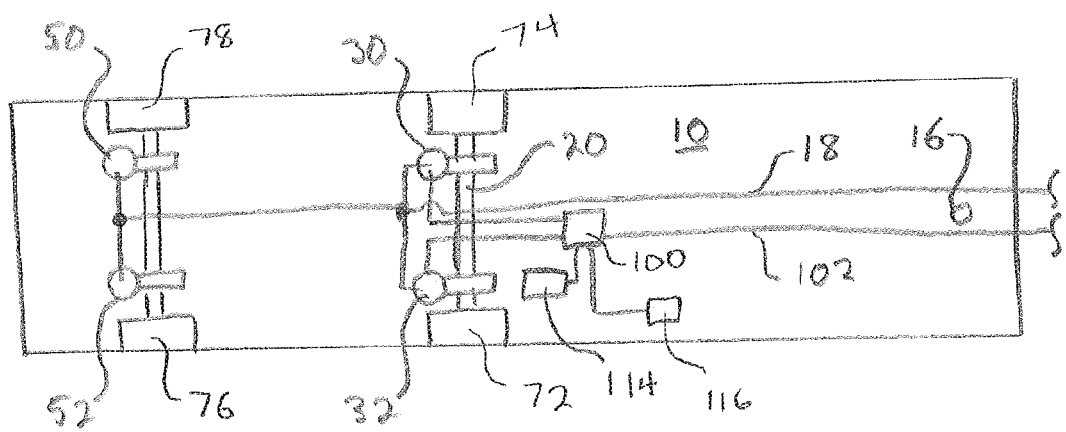
FIG. 8 shows a schematic view of a spread axle trailer 10 showing another alternative embodiment of a system to automatically reduce the downward force of the forward axle tires against the ground upon detection of conditions resulting in tire scrub.

FIG. 8 shows a schematic view of a spread axle trailer 10 showing another alternative embodiment of a system to automatically reduce the downward force of the forward axle tires against the ground upon detection of conditions resulting in tire scrub. Like the previous embodiment, the trailer shown in this embodiment possesses four air suspension bags 30, 32, 50, 52, two located at the forward axle 20 and two located at the rearward axle 40. These air suspension bags 30, 32, 50, 52, are inflated by an air supply, here shown as an air pressure line 18 that is pressurized by a compressor onboard the tractor 1 and each air suspension bag 30, 32, 50, 52 supports a portion of the load of the trailer 10.

In this embodiment a GPS antenna 116 is positioned on the trailer 10. The antenna is connected to the GPS module 114 which receives global positioning signal. The signal is transmitted to the vehicle axle control unit 100. The system also contains at least one transducer, such as an accelerometer or gyroscope, which determines whether the trailer is turning. The vehicle axle control unit 100 receives the transducer sensor signal and the GPS sensor signal and determines if the trailer is moving within a specified speed range and if the trailer is rotating clockwise or counter clockwise at a rate within a specified range. Once it is determined that the trailer speed is within a specified range and the rotation rate is within a specified range and the trailer is rotating counter-clockwise the vehicle axle control unit will release air from the left forward axle air bag 30. If it is determined that the trailer speed is within a specified range and the rotation rate is within a specified range and the trailer is rotating clockwise the vehicle axle control unit will release air from the right forward axle air bag 32.

Figure 9:
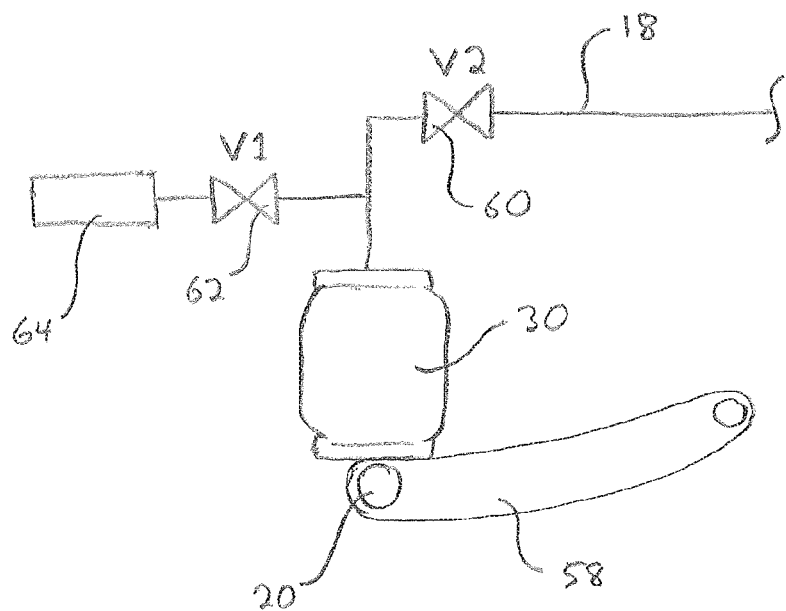
FIG. 9 shows a schematic diagram of the left forward air suspension bag 30 valve control system.

FIG. 9 shows a schematic diagram of the left forward air suspension bag 30 valve control system. The air bag 30 is positioned over the suspension link 58 and when inflated, operates in a spring-like manner to force the axle 20 away from the trailer 10. When it is desired to momentarily reduce the downforce of the left forward tire of the spread axle trailer 10, the air inflate valve (V2) 60 is closed from its normally open position shutting off the air pressure line 18. The air deflate valve (V1) 62 is opened from its normally closed position to allow the air in the forward left airbag 30 to exit the airbag and allow the airbag to collapse. This reduces the downforce of the left forward tire, reducing the frictional force and scrubbing experienced by the tire. When the air deflate valve (V1) 62 is opened, air, under pressure, exits rapidly from the air bag. To reduce the noise of the exiting air, a silencer, or muffler 64 may be attached to attenuate noise from the gas exiting the system.

When it is determined that the momentary reduction in the downforce is no longer needed, the air deflate valve (V1) 62 is closed and the air inflate valve (V2) 60 is opened, allowing air to enter the airbag and inflate it.

Figure 10:
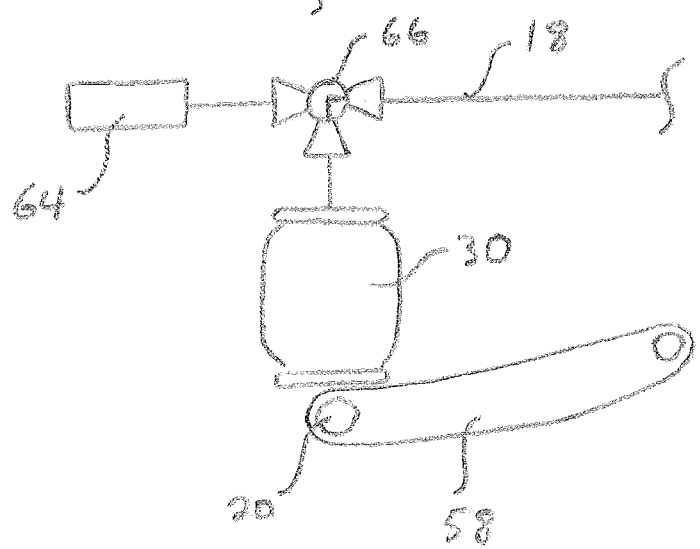
FIG. 10 shows an alternative valve control system for a left forward air suspension bag 30.

FIG. 10 shows an alternative valve control system for a left forward air suspension bag 30. The alternative system operates similarly to the previous system, except instead of having two air valves 60, 62, a single three-way valve 66 allows simultaneous closing of the air pressure line 18 and opening of the air deflate pathway allowing the air suspension bag 30 to deflate.

The vehicle axle control unit 100 operates by receiving sensor signals from the GPS modules 110, 112 and determining if the trailer speed, general direction and severity of the turn requires intervention of the downforce of one or more tires of the forward axle 20. FIG. 19, FIG. 20, FIG. 21 and FIG. 22 depict an embodiment of a process by which the vehicle axle control unit 100 operates.

Figure 19:
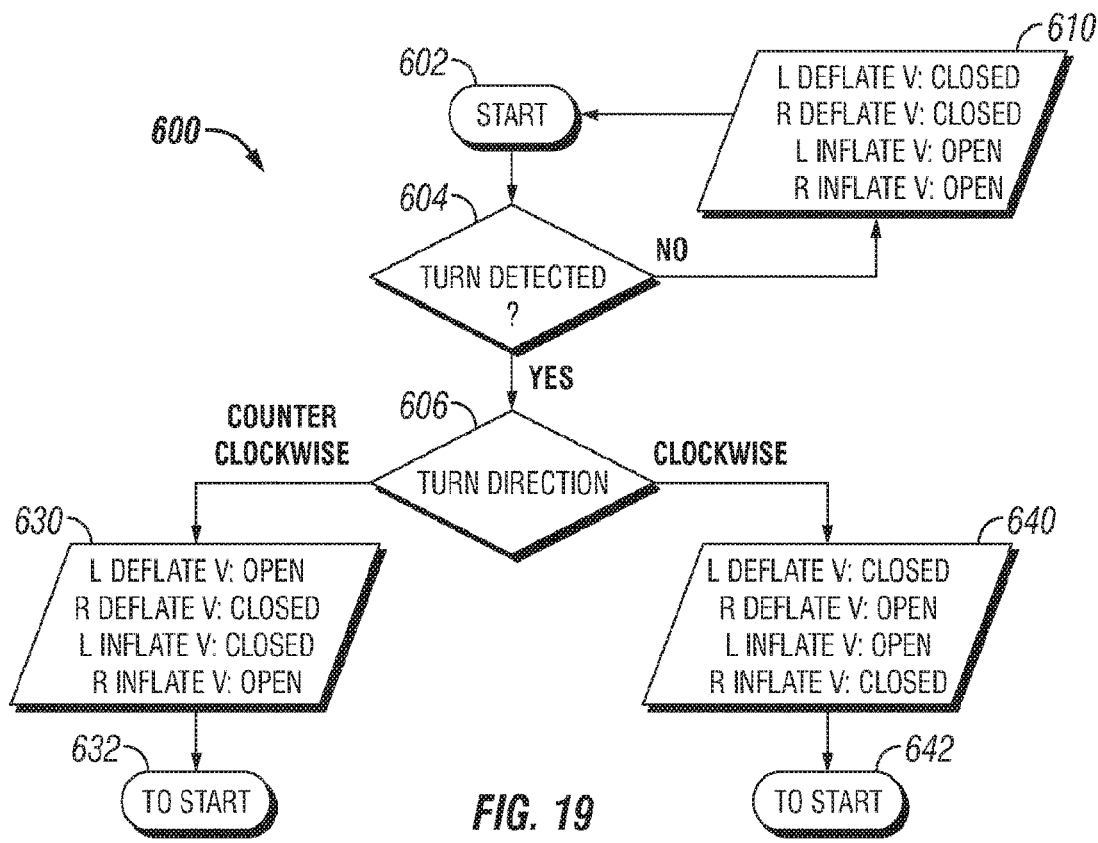
FIG. 19 depicts an embodiment of a process by which the vehicle axle control unit 100 operates.
Figure 20:
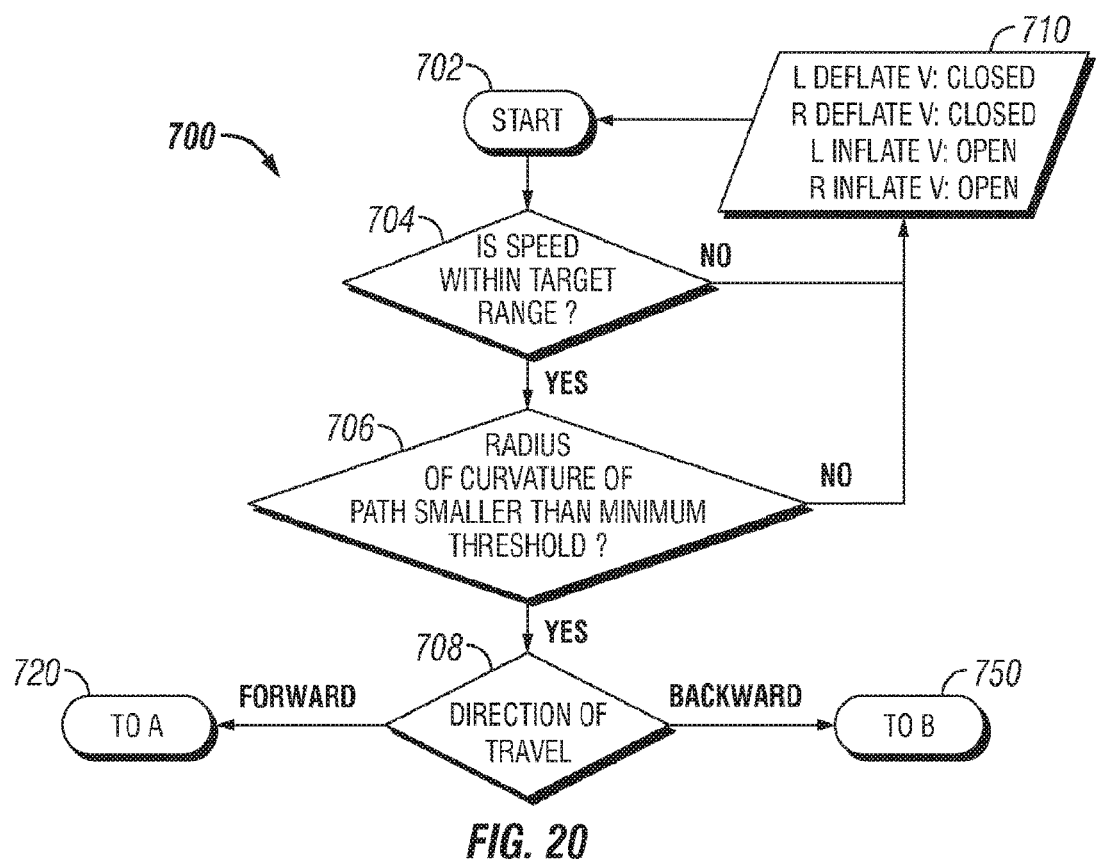
FIG. 20 depicts an embodiment of a process by which the vehicle axle control unit 100 operates.

In FIG. 19, the control process 600 begins with the "Start" 602 step. The vehicle axle control unit receives a sensor signal from the sensor indicating a turn. When a turn is not detected 604, the vehicle axle control unit sends a control signal, or a "no turn control signal" to the axle downforce adjustment mechanism resulting in the deflation valve remaining closed and the inflation valve remaining open, resulting in the suspension airbags maintaining pressure 610. Here the no turn control signal takes the form of an absence of an electrical current. Alternatively the no turn control signal may take the form of an electrical current, or alternatively an impulse or alternatively a waveform. In this embodiment, the combination of the sample rate and threshold of detection is set such that a turn is only detected when the turn radius is sufficiently tight and the speed is sufficiently slow to warrant scrub intervention to occur. When a turn is detected 604 the vehicle axle control unit determines from the sensor signal whether the turn direction is counter-clockwise or clockwise and then reducing the downward pressure applied by the air suspension on one or more airbags. The system then signals for the opening and closure of the valves depending upon whether the rotation of the vehicle, as viewed from the sky, is clockwise or counter clockwise 630 or 640. If the rotation of the trailer turn is clockwise, the control unit sends a control signal to the Right Deflate Valve to open and the Right Inflate Valve to close in step 640. Upon detection of a counter-clockwise turn, the control unit 100 sends the control signal to the Left Deflate Valve to open and the Left Inflate Valve to close in step 630. Upon the vehicle axle control unit no longer detecting a turn, the Right and Left Deflate Valves are closed and the Right and Left Inflate Valves are opened in step 610, returning the axle to normal loading In FIG. 20, understanding the process begins at the "Start" 702 step. The control unit 100 determines if the vehicle speed is within a desired range for intervention. For example, if the speed of the vehicle is over 30 mph, the system will not intervene in the downforce of the tires of the vehicle. Instead, the system will maintain the status of the Left Deflate Valve and Right Deflate Valve as "closed" and the Right Inflate Valve and Left Inflate Valve as "open" as shown in output box 710. If the control unit 100 determines that the vehicle speed is within the targeted range in step 704, the control unit then will determine if the radius of curvature of the path is smaller than a predetermined minimum value 706. If the radius of curvature is not smaller than the predetermined minimum value, then the system does not intervene and the process begins again at the start 702. If the control unit 100 determines that the radius of curvature of the path of the vehicle 10 is smaller than a minimum threshold 706, then the system determines the direction of travel of the vehicle 708.

Figure 21:
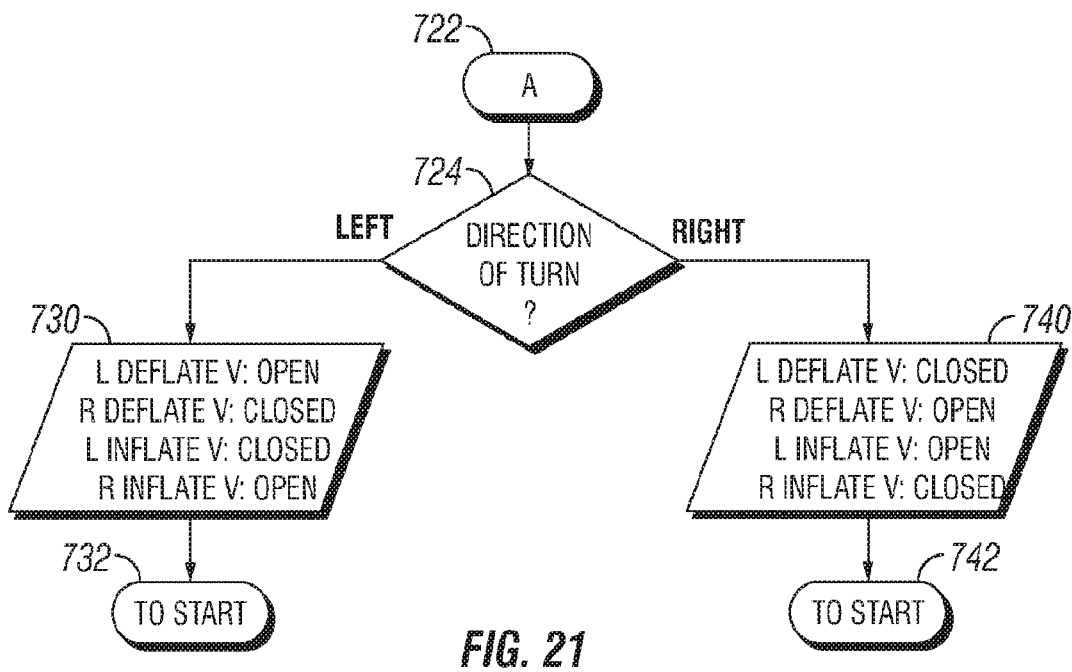
FIG. 21 depicts an embodiment of a process by which the vehicle axle control unit 100 operates.

If the control unit 100 determines that the vehicle is moving forward, it will then continue the process as shown in FIG. 21 by determining the direction of the turn 724. If the control unit determines that the vehicle is turning to the left, the control unit will intervene in the downforce of the forward axle unit by closing the Left Inflate Valve and opening the Left Deflate Valve as shown in step 730. This allows for a reduction of force under just the left portion of the forward axle, reducing tire scrub on the left forward tires. This allows the forward axle to support a portion of the load while mitigating tire scrub. This may be particularly desirable on public roads where tire loading should be minimized to avoid damage to the roads. Alternatively, if the control unit determines that the vehicle is turning to the right, the control unit will intervene in the downforce of the forward axle unit by closing the Right Inflate Valve and opening the Right Deflate Valve as shown in step 740. This allows for a reduction of force under just the right portion of the forward axle, reducing tire scrub on the right forward tires. Likewise, this allows the forward axle to support a portion of the load while mitigating tire scrub. Alternatively, both right and left forward airbags 30 and 32 may be deflated, reducing the downforce on all tires attached to the forward axle 20. The process then returns to the start 702 to continue monitoring the vehicle movement.

Figure 22:
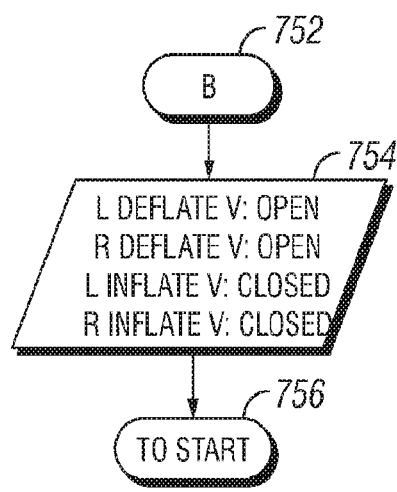
FIG. 22 depicts an embodiment of a process by which the vehicle axle control unit 100 operates.

If, on the other hand, the control unit 100 determines that the vehicle is moving backward, it will then continue the process as shown in FIG. 22. Under these circumstances both airbags may be deflated, reducing the loading of all tires attached to the forward axle, thereby mitigating tire scrub. In this situation, the control unit 100 sends a control signal to the left inflation valve V2 and the right inflation valve V2 to close and the control signal to the left deflation valve V1 and the right deflation valve V1 to open, allowing air to escape the airbags, 30, 32. The process then returns to the start 702 to continue monitoring the vehicle movement.

In an alternative embodiment, the control unit 100, when it determines that the vehicle is moving backwards at a speed within a specified range and a turn radius of less than a specified value, opens the Left Deflate Valve and closes the Left Inflate Valve upon detection of a turn to the right. In this alternative embodiment, when the control unit 100 determines that the vehicle is moving backwards at a speed within a specified range and a turn radius of less than a specified value, opens the Right Deflate Valve and closes the Right Inflate Valve upon detection of a turn to the left. This reduces the force applied to the forward axle tire being forced laterally toward the centerline of the vehicle, mitigating any scrub damage to the tire and ground surface.

It should be understood that the order of the process may be rearranged and still be within the scope of the invention disclosed herein. For example, the control unit 100 may determine the direction of the vehicle first, then determine whether the vehicle is within a predetermined range of speed for it to intervene in the downforce of the forward axle.

Figure 23:
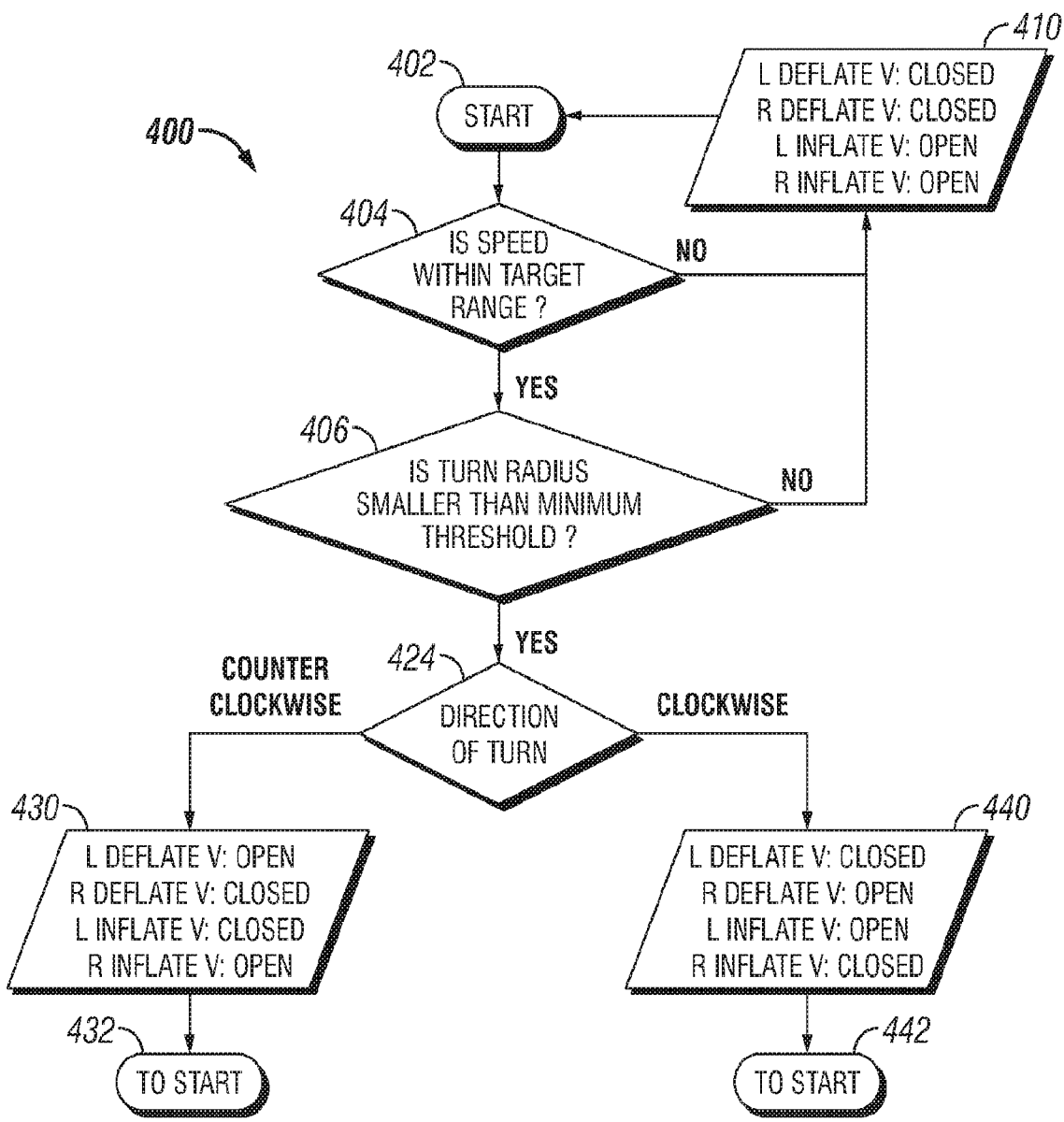
FIG. 23 shows an embodiment where the system determines whether the trailer is rotating counterclockwise or clockwise and reduce the downward pressure applied by the air suspension on one or more airbags upon detection of a the trailer speed falling within a specified range and a turning radius being smaller than a minimum threshold.

The process may be carried out by detecting whether the vehicle is moving counterclockwise or clockwise and reduce the downward pressure applied by the air suspension on one or more airbags upon detection of a the vehicle speed falling within a specified range and a turning radius being smaller than a minimum threshold. For example, FIG. 23 shows the process 400 starting at step 402. Upon detection of a vehicle speed within a targeted range 404 and a turn radius smaller than a minimum threshold in step 406, the system then signals for the opening and closure of the valves depending upon whether the rotation of the vehicle, as viewed from the sky, is clockwise or counter clockwise 424. If the rotation of the vehicle turn is clockwise, the control unit sends a control signal to the Right Deflate Valve to open and the Right Inflate Valve to close in step 440. Upon detection of a counter-clockwise turn, the control unit 100 sends the control signal to the Left Deflate Valve to open and the Left Inflate Valve to close in step 430. Upon detection of the vehicle speed being outside the targeted range, or a turn radius that is larger than the minimum threshold, the Right and Left Deflate Valves are closed and the Right and Left Inflate Valves are opened in step 410.

Figure 24:
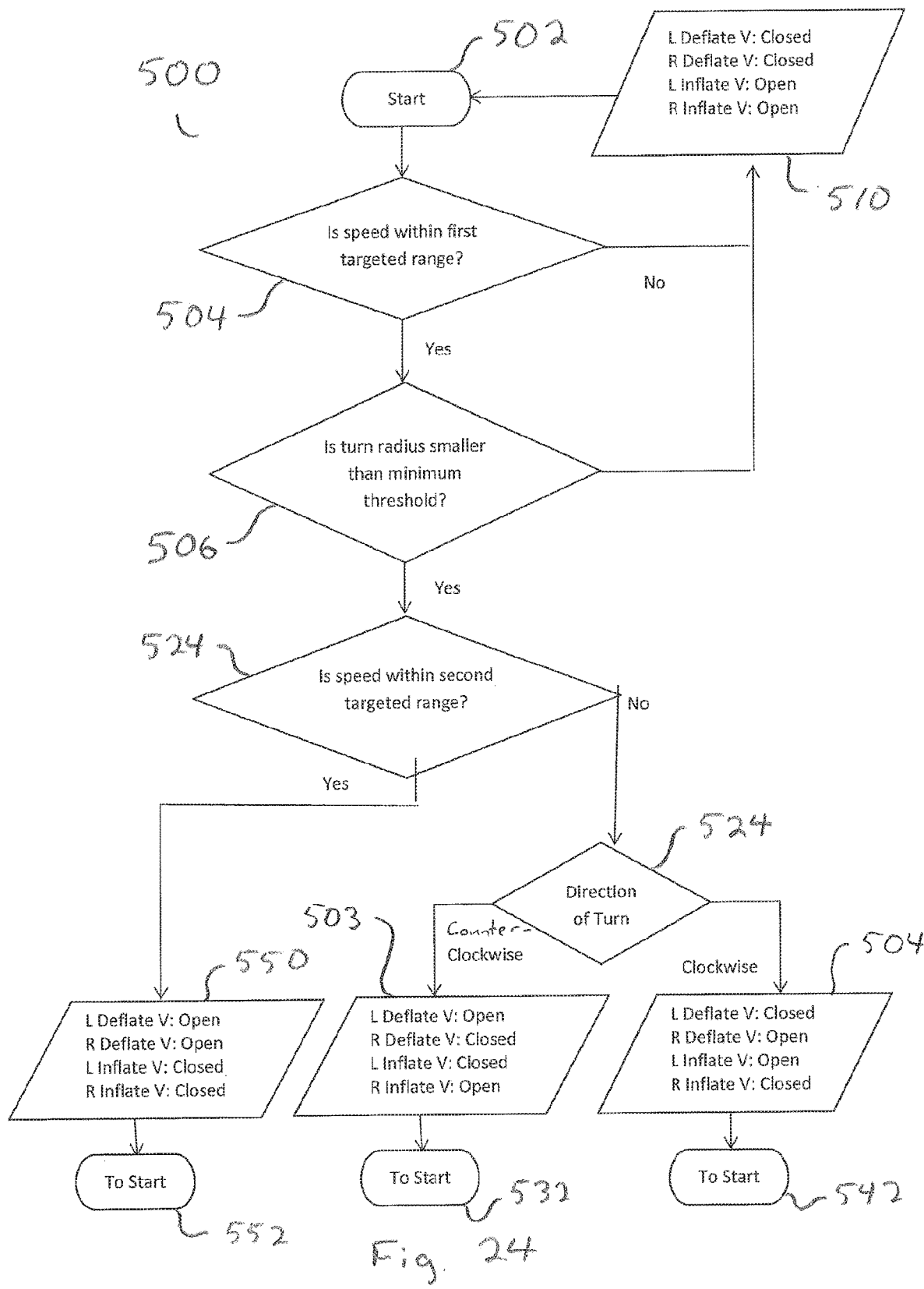
FIG. 24 shows an embodiment where the system deflates both the left and right forward axle suspension airbags upon detection of a trailer speed that falls within a second targeted range.

In yet another alternative embodiment, such as the embodiment shown in FIG. 24, the system dumps the air from both the left and right forward axle suspension airbags upon detection of a vehicle speed that falls within a second targeted range. For example, upon detection of the vehicle traveling within a range of −5 MPH to 5 MPH, and a turn radius of less than 50 feet the system, the control unit 100 would open the Left and Right Deflation Valves and close the Left and Right Inflation Valves on the forward vehicle axle 550. If, however, the vehicle is traveling between −10 MPH and −5 MPH or between 5 MPH and 20 MPH, the control unit 100 would open the Left Deflate Valve and close the Left Inflate Valve upon detection of a counter-clockwise turn 530 or open the Right Deflate Valve and close the Right Inflate Valve upon detection of a clockwise turn 540. The system would continue back to start 532, 542, 552 so as to continue monitoring the vehicle turn radius, speed and direction of turn.

Figure 11:
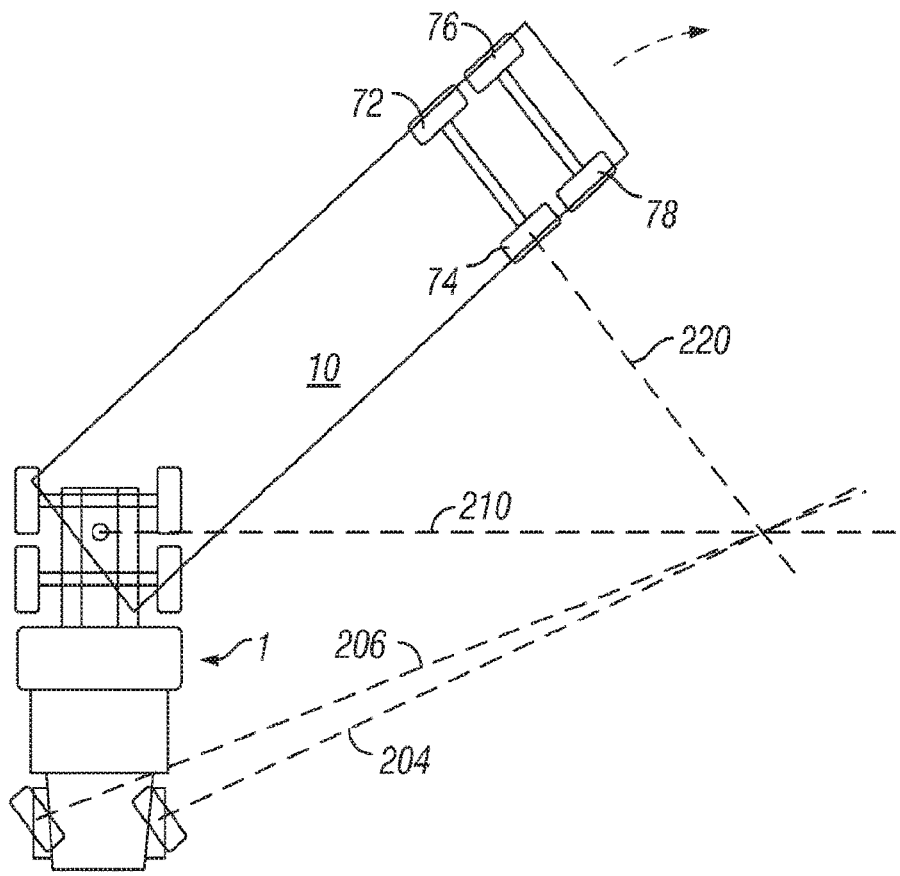
FIG. 11 shows a conventional "close spaced" dual axle trailer during a rearward left turn.
Figure 12:
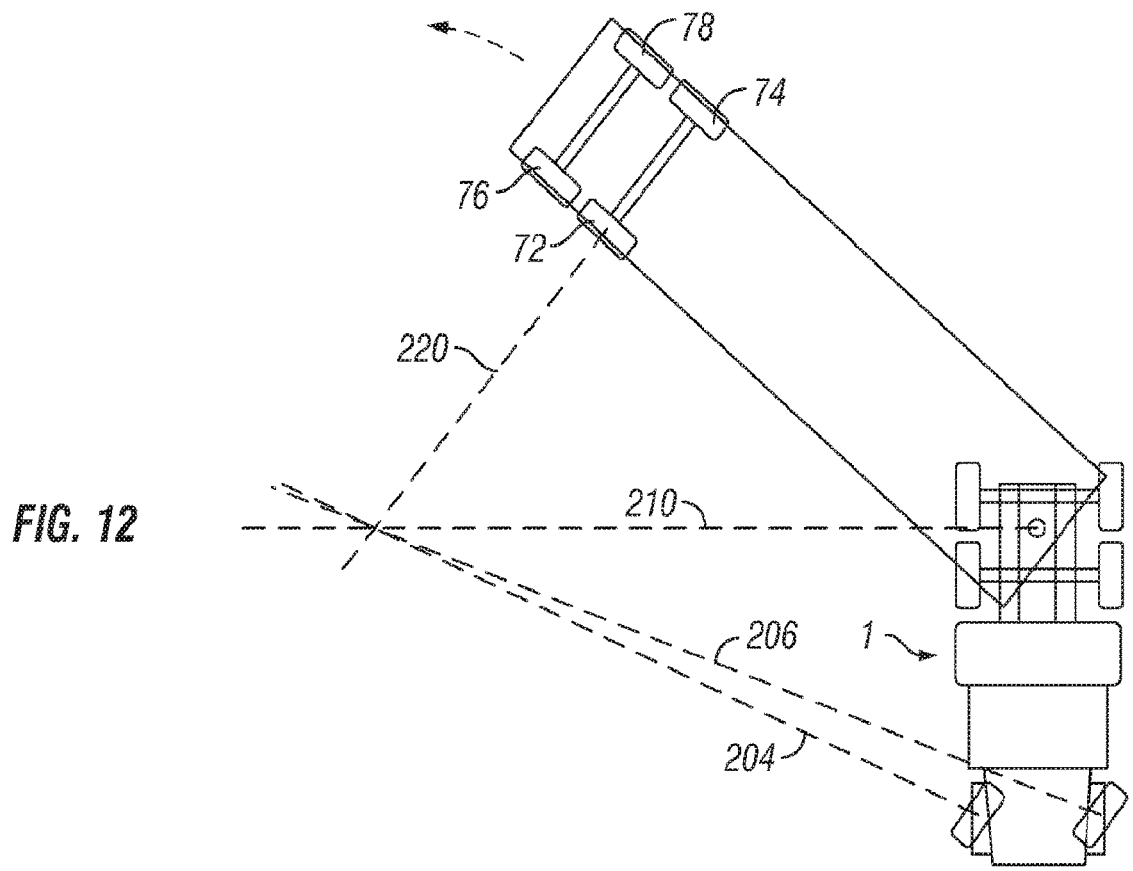
FIG. 12 shows a conventional "close spaced" dual axle trailer during a rearward right turn, counterclockwise.

It should also be understood that this system may apply to spread axle trailers and other vehicles, other than spread axle trailers. For example, as shown in in FIG. 11 and FIG. 12, the system may be applied to a conventional (close-spaced) tandem axle trailer. In this example, upon detection of a clockwise turn the left rear axle airbag is deflated reducing the downward force applied by the left rear tire 78 as shown in FIG. 11. Upon detection of counter clockwise turn, the right rear axle airbag is deflated reducing the downward force applied by the right rear tire 76 as shown in FIG. 12. In this embodiment, the rear axle airbags are chosen to be deflated based upon which wheel is being driven laterally toward the centerline of the trailer.

Alternatively, the forward axle airbags may be deflated. In such situations, both airbags may be deflated or only one airbag may be deflated. In the instance where one airbag is deflated, the airbag on the side of the axle of the wheel being laterally driven toward the centerline of the trailer during the turn would be chosen by the vehicle axle control unit.

Figure 13:
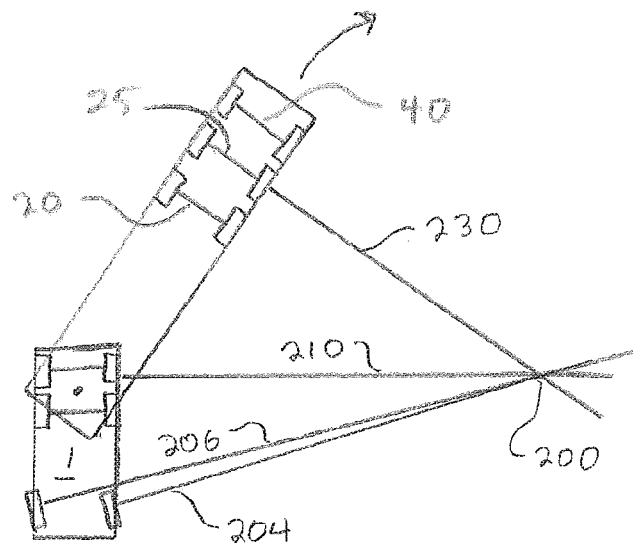
FIG. 13 shows a triple-axle or "tridem" trailer during a rearward left turn, clockwise.
Figure 14:
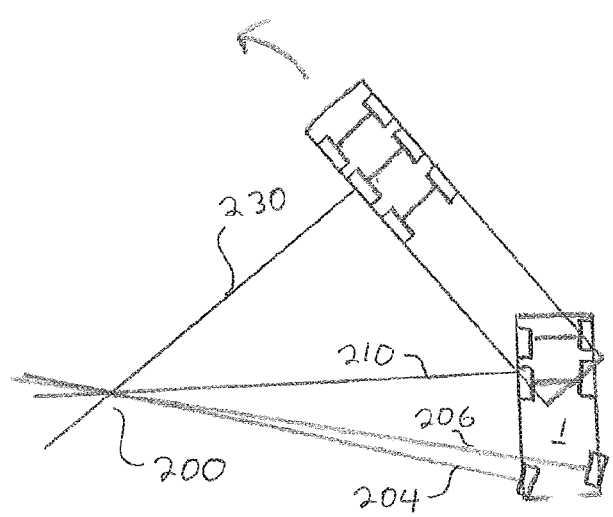
FIG. 14 shows a triple-axle or "tridem" trailer during a rearward right turn, counterclockwise.

In another example, the invention is applied to a triple-axle, or "tridem" trailer as shown in FIG. 13 and FIG. 14. In this particular example, the airbags of the forward axle 20 and rearward axle 40 are deflated during low speed short radius turns. In this embodiment, the middle axle 25 airbags are not adjusted. When a clockwise turn is detected falling within a predetermined turn radius range and a predetermined speed range, the control unit sends a control signal to deflate the forward right axle airbag and deflate rearward left axle airbag as shown during the rearward turn in FIG. 13. When a counter-clockwise turn is detected falling within a predetermined turn radius range and a predetermined speed range, the control unit sends the control signal to deflate the forward left axle airbag and deflate rearward right axle airbag as shown during the rearward turn in FIG. 14. It should be understood that when clockwise turn is detected falling within a predetermined turn radius range and a predetermined speed range, the control unit sends the control signal to deflate the forward right axle airbag and deflate rearward left axle airbag when the trailer is moving forward. Likewise when a counter-clockwise turn is detected falling within a predetermined turn radius range and a predetermined speed range, the control unit sends the control signal to deflate the forward left axle airbag and deflate rearward right axle airbag when the trailer is moving forward.

Figure 15:
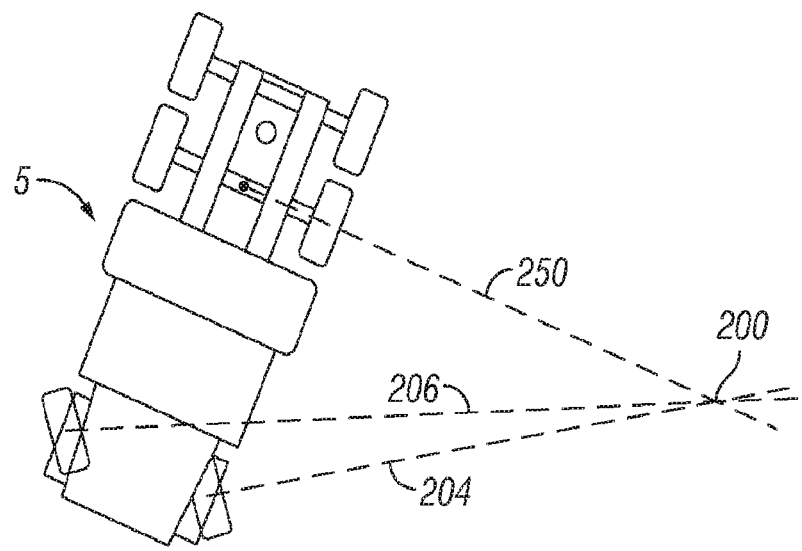
FIG. 15 shows a 6×2 rear tag axle truck with a rear tag axle navigating a left turn.
Figure 16:
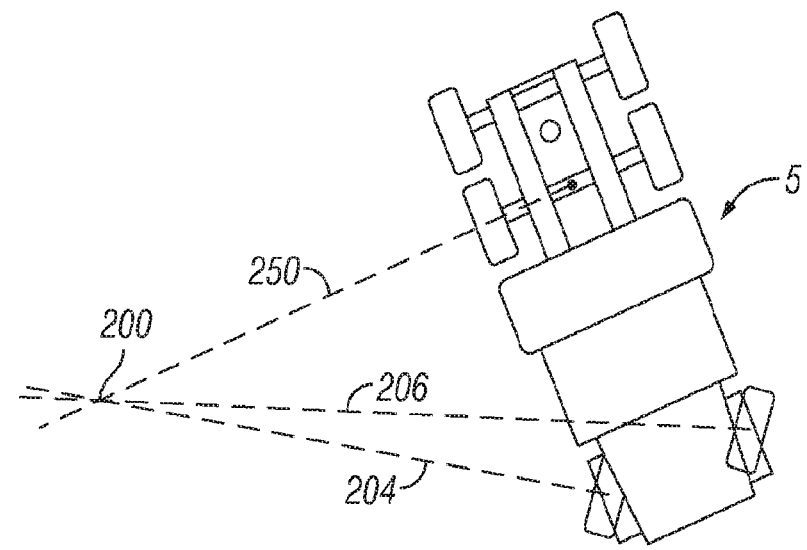
FIG. 16 shows a 6×2 rear tag truck axle during a right turn.

The invention may also be applied to an embodiment of a 6×2 truck with a tag axle as shown in FIG. 15 and FIG. 16 where the drive axle is the forward rear axle and the tag axle is the rearward rear axle. In this case when the truck is turning counter-clockwise, such as when the truck is being driven forward in FIG. 15 or rearward in FIG. 16, the right airbag of the tag axle is deflated. When the truck is turning clockwise, such as when the truck is being driven rearward in FIG. 15 or forward in FIG. 16, the left airbag of the tag axle is deflated.

Figure 17:
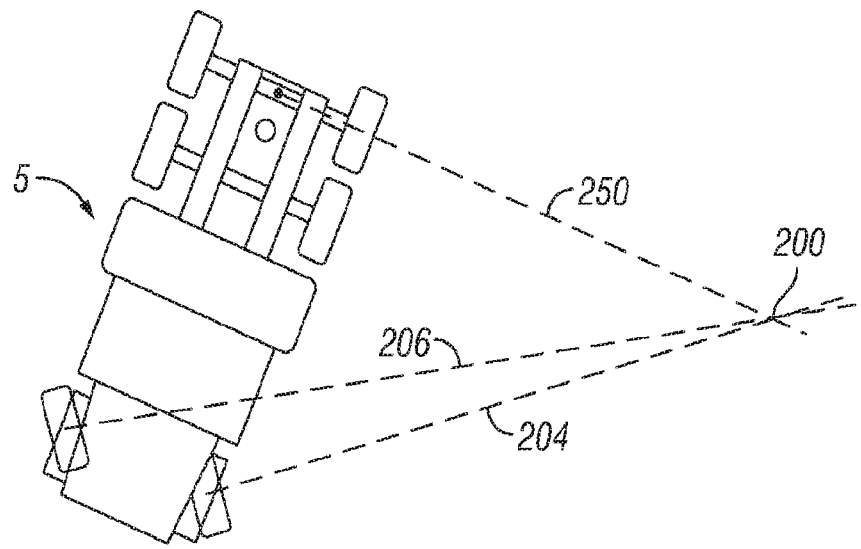
FIG. 17 shows a truck in a "pusher" configuration with a forward free-turning axle in a left turn.
Figure 18:
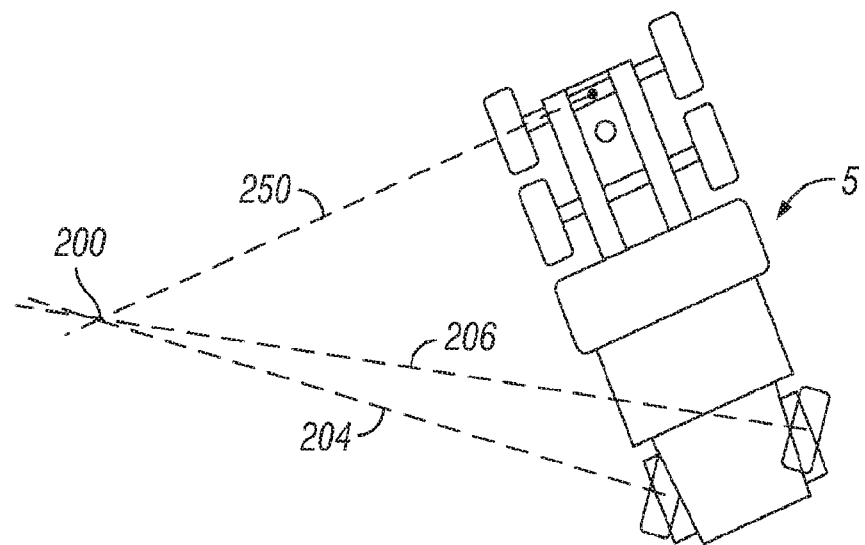
FIG. 18 shows a truck in a "pusher" configuration with a forward free-turning axle in a right turn.

Likewise, the invention may also be applied to the embodiment of a truck in a "pusher" configuration as shown in FIG. 17 and FIG. 18 where the drive axle is the rearward rear axle and the free rolling axle is the forward rear axle. In this case when the truck is turning clockwise, such as when the truck is being driven rearward in FIG. 17 or forward in FIG. 18, the right airbag of the free rolling axle is deflated. When the truck is turning counter-clockwise, such as when the truck is being driven forward in FIG. 15 or rearward in FIG. 16, the left airbag of the free rolling axle is deflated.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 25:
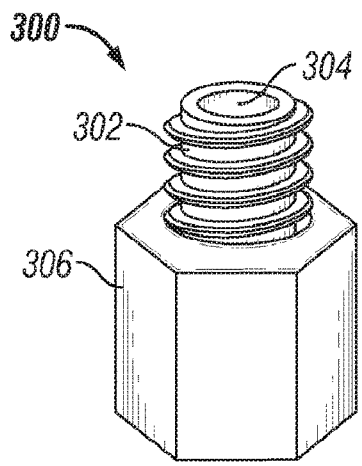
FIG. 25 shows a perspective view of an adaptor for the nozzle of the airbag of the air suspension to allow for higher air flow rate than what would be achieved if using a conventional compression fitting.
Figure 26:
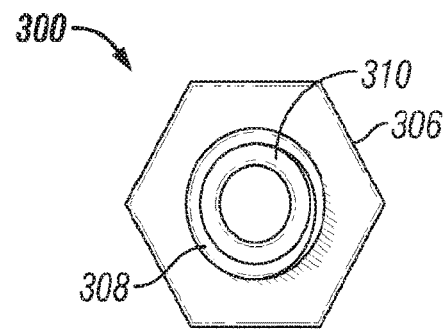
FIG. 26 shows a bottom view of the adaptor.
Figure 27:
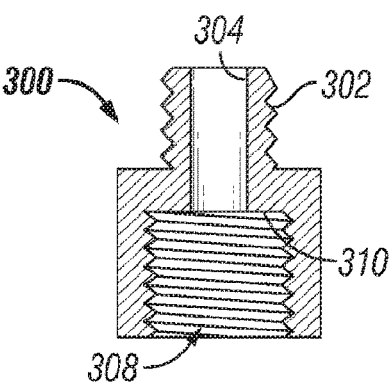
FIG. 27 shows a cross section view of the adaptor taken across the mid-plane of the adaptor along its length.

The standard air bag possesses an airbag inlet spout 34 which connects to the airline hose from the tractor 1. This inlet spout connects to a ¼ inch NPT male compression fitting adaptor fitting screwed into the inside threads of the spout. The ¼ inch adaptor fitting is very restrictive of airflow into and out of the airbag. In order to reduce the time for the downforce on the forward axle to be reduced, it has been found desirable to replace the ½ inch fitting with a custom adaptor having a 7/16 inch diameter aperture 304 as shown in FIG. 25. This adaptor 300 threads onto the outer diameter threads and greatly increases the evacuation air flow. The adaptor has a hex head 306 base for tightening it onto the inlet spout 34 of the air bag. FIG. 26 shows a bottom view of the adaptor and FIG. 27 shows a cross section of the adaptor showing the inner female threads 308 and the sealing surface 310 which mates with a seal and the top of the inlet spout 34.

Figure 28:
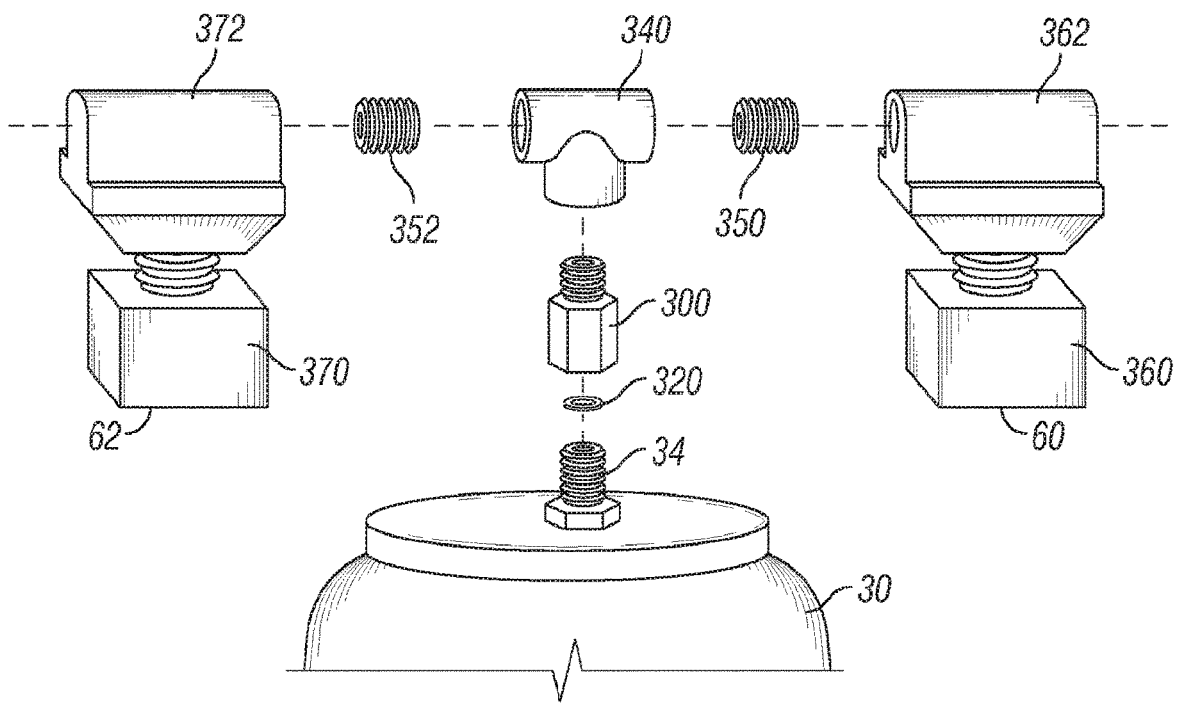
FIG. 28 shows an exemplary embodiment of a control valve assembly of the axle airbag that is desired to be controlled.

FIG. 28 shows an exemplary embodiment of a control valve assembly of the axle airbag that is desired to be controlled. In this embodiment, the airbag is the forward axle suspension airbag 30. The air supply attaches to the air inflate valve 60 which comprises of an inflation valve body 362 and inflation valve solenoid 360. The air inflate valve 60 attaches to a "T" fitting 340 which then attaches to the outlet valve 62 which includes an outlet valve body 372 and an outlet valve solenoid 370. The solenoids and valve bodies are connected by the "T" fitting 340 to the air inlet nozzle 34 of the forward axle air bag 30 to allow for the ingress of air, and exit of air from the air suspension bag. The high flow adaptor 300 couples the "T" fitting 340 to the air inlet nozzle 34. A small copper washer seal 320 is used here to seal between the top of the air nozzle 32 of the airbag and the internal sealing surface 310 of the adaptor 300. Alternatively a single three way valve may be substituted for the two valves so as to have a similar operation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A system for controlling downforce on at least one of a plurality of tires on a vehicle in order to reduce scrubbing, the vehicle having at least one forward axle and at least one rearward axle spaced apart from the forward axle, each axle having at least one right tire and at least one left tire, an axle downforce adjustment mechanism to adjust of the downforce of at least one tire, the system comprising:
   a sensor attached to the vehicle for detecting vehicle turns;
   a vehicle axle control unit;
   wherein said sensor sends a sensor signal to the vehicle axle control unit;
   wherein the vehicle axle control unit uses the sensor signal to determine if the vehicle is turning;
   wherein the vehicle axle control unit determines if the vehicle is moving forward or is moving backwards;
   wherein when the vehicle axle control unit determines the vehicle undergoing a counterclockwise turn and is below a given speed and the vehicle is moving forward the vehicle axle control unit sends a control signal to the axle downforce adjustment mechanism to reduce the downforce at the left forward axle tire, and wherein downforce at the right forward axle tire is maintained and not modified;
   wherein when the vehicle axle control unit determines the vehicle undergoing a clockwise turn and is below the given speed and the vehicle is moving forward the vehicle axle control unit sends the control signal to the axle downforce adjustment mechanism to reduce the downforce at the right forward axle tire, and wherein downforce at the left forward axle tire is maintained and not modified;
   wherein when the vehicle axle control unit determines the vehicle is below a given speed and turning and the vehicle is moving backwards the vehicle axle control unit sends the control signal to the axle downforce adjustment mechanism to reduce the downforce at the right forward axle tire and to reduce the downforce at the left forward axle tire.

2. The system of claim 1 wherein the vehicle is a trailer.

3. The system of claim 1 wherein the vehicle is a truck.

4. The system of claim 1 wherein the sensor is a gyroscope, wherein the vehicle axle control unit receives the sensor signal from the gyroscope and sends the control signal to the axle downforce adjustment mechanism upon determining that the sensor signal is within a predetermined range.

5. The system of claim 1 wherein the sensor is an accelerometer, wherein the vehicle axle control unit receives the sensor signal from the accelerometer and sends the control signal to the axle downforce adjustment mechanism upon determining that the sensor signal is within a predetermined range.

6. The system of claim 1 wherein the sensor is a global positioning system module, wherein the vehicle axle control unit receives the sensor signal from the global positioning sensor and sends the control signal to the axle downforce adjustment mechanism upon determining that the sensor signal indicates a turn.

7. The system of claim 1 wherein the axle downforce adjustment mechanism comprises:
   an airbag connected to a pressurized air supply;
   a first valve connected to the airbag, said first valve having an open position and a closed position; and
   a first actuator that controls the first valve;
   wherein upon said control signal from the vehicle axle control unit, the first actuator opens the first valve allowing air to exit the airbag, thereby reducing the downforce of the at least one axle tire.

8. The system of claim 7 wherein the axle downforce adjustment mechanism further comprises:
   a second valve; and
   a second actuator;
   wherein said second valve is positioned between the airbag and the pressurized air supply;
   wherein when the vehicle axle control unit is not signaling to reduce the downforce of at least one axle tire the second valve is open and the first valve is closed,
   wherein when the vehicle axle control sends the control signal to reduce the downforce of at least one axle tire, the second valve closes and the first valve opens.

9. The system of claim 7 wherein the first valve is positioned between the airbag and the pressurized air supply, wherein the first valve is a three way valve having a first position where the air supply is in fluid communication with the airbag, the first position allowing the airbag to pressurize, and a second position where the air supply and the airbag are not in fluid communication and the airbag is in fluid communication with the atmosphere thereby allowing the reduction of downforce when the vehicle axle control unit signals to reduce the downforce of at least one axle.

10. The system of claim 1 wherein the vehicle axle control unit sends the control signal to reduce the downforce when in addition to being below the given speed the vehicle turn radius is smaller than a minimum threshold.

11. The system of claim 1 wherein when the vehicle axle control unit does not detect a turn the vehicle axle control unit sends a no turn signal to the axle downforce adjustment mechanism so as to not reduce the downforce.

12. The system of claim 1 wherein upon detection of a turn and upon detection that the vehicle speed is below the given speed the system further determines whether the vehicle speed is within a second targeted range wherein upon detection that the vehicle is below the given speed and the second targeted range the vehicle axle control unit sends the control signal to the axle downforce adjustment mechanism to reduce the downforce at the right axle tire and left axle tire, and upon detection that the vehicle speed is below the given speed but outside the second targeted range, the vehicle axle control unit sends the control signal to the axle downforce adjustment mechanism so as to adjust the downforce on either the left axle tire or the right axle tire.

13. A vehicle that controls the downforce on at least one of a plurality of tires on the vehicle in order to reduce scrubbing, the vehicle comprising:
at least one forward axle having at least one right tire and at least one left tire;
at least one rearward axle spaced apart from the forward axle, the rearward axle having at least one right tire and at least one left tire;
an axle downforce adjustment mechanism to adjust the downforce of the at least one axle tire,
a sensor attached to the vehicle for detecting vehicle turns;
a vehicle axle control unit;
wherein said sensor sends signal data to the vehicle axle control unit;
wherein the vehicle axle control unit determines if the vehicle is moving forward or is moving backwards;
wherein when the vehicle axle control unit determines the vehicle undergoing a counterclockwise turn and is below a given speed and the vehicle is moving forward the vehicle axle control unit sends a control signal to the axle downforce adjustment mechanism to reduce the downforce at the left forward axle tire, and wherein downforce at the right forward axle tire is maintained and not modified;
wherein when the vehicle axle control unit determines the vehicle undergoing a clockwise turn and is below the given speed and the vehicle is moving forward the vehicle axle control unit sends the control signal to the axle downforce adjustment mechanism to reduce the downforce at the right forward axle tire, and wherein downforce at the left forward axle tire is maintained and not modified;
wherein when the vehicle axle control unit determines the vehicle is below a given speed and turning and the vehicle is moving backwards the vehicle axle control unit sends the control signal to the axle downforce adjustment mechanism to reduce the downforce at the right forward axle tire and to reduce the downforce at the left forward axle tire.

14. The vehicle of claim 13 wherein the vehicle is a trailer.

15. The vehicle of claim 13 wherein the vehicle is a truck.

* * * * *